March 1, 1960  J. Z. DE LOREAN  2,926,510
UNIVERSAL JOINT

Filed Oct. 13, 1958  2 Sheets-Sheet 1

INVENTOR.
John Z. DeLorean
BY
L.P.Burch
ATTORNEY

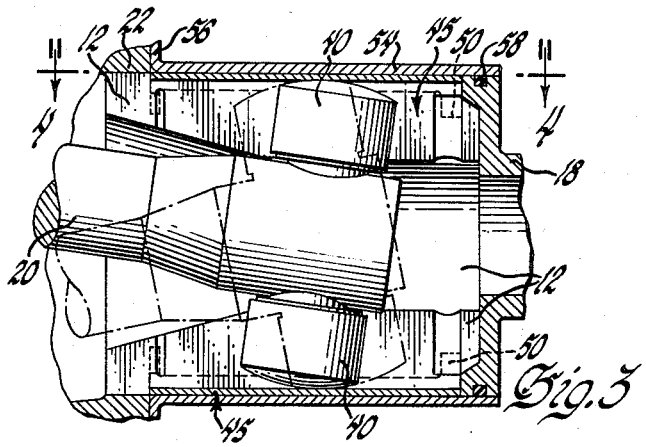
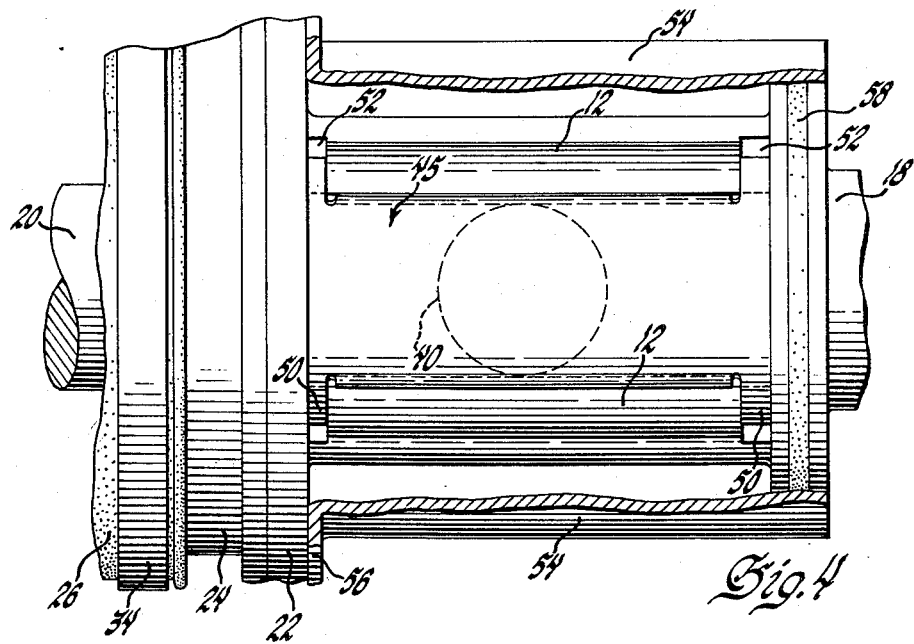
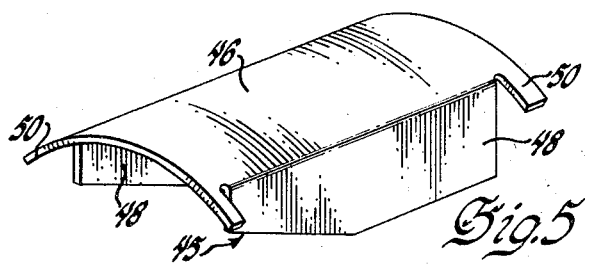

United States Patent Office 2,926,510
Patented Mar. 1, 1960

2,926,510

UNIVERSAL JOINT

John Z. De Lorean, Birmingham, Mich., assignor to General Motors Corporation, Detroit, Mich., a corporation of Delaware Application October 13, 1958, Serial No. 766,895

4 Claims. (Cl. 64—8)

This invention relates to universal joints and more particularly to a means for providing a universal joint housing adaptable to more precise and more economic manufacturing procedures.

There has been a great amount of difficulty in manufacturing the housings of sliding or "pot-type" universal joints. The manufacturing process of such housings generally begins with a rough casting having cored axial openings which, after machining, receive the drive shaft and the trunnion and bearing assemblies. The cored openings must be finish machined, usually requiring several blind boring or drilling operations. The final structure must be absolutely accurate and precise, otherwise, the joint will not function properly, requiring a greater than average amount of skill in the machining process. Thus, the resulting universal joint is relatively expensive, as a result of the added costs and extra skill required, making this type of universal joint unsuitable for production requirements.

The device in which this invention is embodied comprises a universal joint housing having a slot formed therethrough in a transverse direction and a pair of inserts to close the openings made thereby. The housing begins as a rough casting with cored openings, however, the openings are in perpendicular relation. It is only necessary, in the following machining operations, to broach the transverse slot in a single pass. On assembly of the joint the inserts are placed in the ends of the slot to provide the bearing surfaces for the bearing cap and bearing assemblies. The skill required in machining the housing is not as great as otherwise required and the resulting structure is more precise and more accurate than previously possible. The end results are a more efficient joint, a more economical manufacturing process and a joint readily adaptable to modern production methods.

Figure 3 is a view of a portion of the joint shown in Figure 1 with parts broken away and in section and illustrating the workability of the joint.

Figure 4 is a plan view of the universal joint of Figure 1 taken substantially along the line 4—4 of Figure 3 and looking in the direction of the arrows.

Figure 5 is a perspective view of the insert used in the universal joint of Figure 1.

Figure 1:
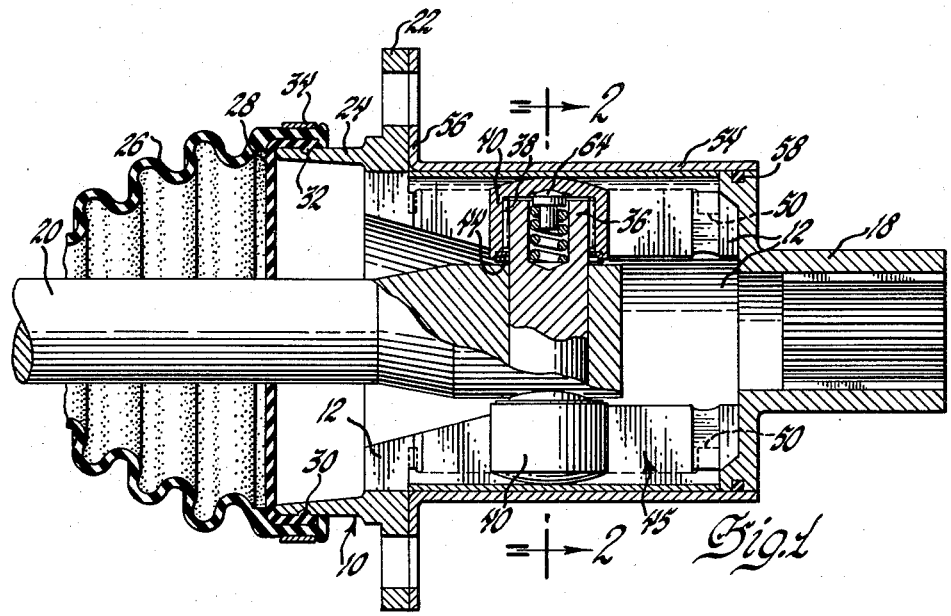
Figure 1 is an elevational view of a universal joint embodying the invention with parts broken away and in section to show the relative location and position of the parts.
Figure 2:
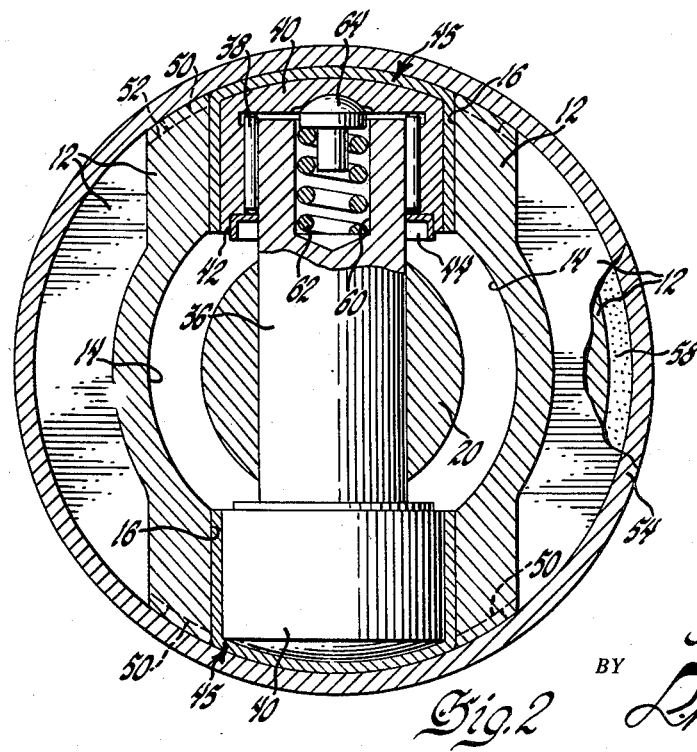
Figure 2 is a sectional view of the universal joint of Figure 1 taken substantially along the line 2—2 of Figure 1 and looking in the direction of the arrows.

Referring more particularly to the drawings, Figures 1 and 2 best show the construction of the joint. The joint housing 10 would be originally in the form of a rough casting. The housing consists of a main body portion 12 which contains the central shaft receiving opening 14 and the transverse slot 16. An internally splined extension 18 receives the connecting shaft, not shown, which receives torque from, or transmits torque to, the shaft 20. An outer flange 22 extends radially outwardly from the main body portion 12, the purpose of which will be later described. A second extension 24 extends axially from the main portion 12 and serves as a means for securing the boot 26 and the oil seal 28, both of conventional construction. An annular groove 30 in the extension 24 receives a cooperating rib 32 formed in the oil seal, the seal and the boot being retained on the extension 24 by the resilient ring 34.

A cross shaft, or trunnion, 36 is received in the end of the shaft 20 within the housing 10 and extends into the transverse slot 16. An annulus of needle bearings 38 are retained about either end of the trunnion 36 and serve to allow relatively frictionless rotation of the bearing caps 40. Annular grooves 42 in the base of the bearing caps receive the retaining rings 44 which prevent the needle bearings from dropping out. The retaining ring 44 may be of any known construction.

In order to close the ends of the transverse slot 16 after the broaching or machining operation, an insert 45, as shown in Figure 5, is received in the housing. The insert comprises a main portion 46 which is arcuately formed to correspond to the configuration of the cross section of the bearing cap 40. A pair of side flanges 48 are bent downwardly from the main portion 46 to extend between the bearing cap 40 and the side walls of the transverse slot 16, as shown in Figure 2. The flanges 48 provide the rolling surfaces for the bearing caps, eliminating the high surface finish otherwise necessary for the walls of the transverse slot. A plurality of ears 50 extend from the corners of the main portion 46 of the insert 45 and these ears are received in a plurality of cavities 52 formed in the surface of the main body 12 of the housing 10. Thus, the insert is prevented from sliding into the transverse slot 16.

A cylindrical cover 54 surrounds the main body 12 of the housing, terminating in an annular flange 56 which abuts, and is secured to, the housing flange 22. An O-ring 58, received in a groove at the opposite end of the body 12 from the flange 22, prevents the entry of foreign matter between the cover 54 and the body 12. The cover serves to retain the inserts 46 in the proper position in relation to the housing 10 and the bearing caps 40.

An opening 60 in either end of the trunnion shaft 36 receives a spring 62 and a thrust button 64. The thrust button bears against the inner surface of the bearing cap 40 to bias the bearing cap into engagement with the insert 45. Proper rolling engagement is thus maintained between the bearing cap 40 and the insert 45.

It may be seen, therefore, that an axially sliding universal joint housing is provided which requires a minimum amount of machining operations in forming the housing from a rough casting and a means for providing relatively frictionless rolling surfaces for the bearing and bearing cap assemblies.

I claim:

1. A universal joint comprising a housing having a transverse slot therethrough and an axial shaft receiving opening therein, a shaft slidingly receivable in said opening, a trunnion and bearing assembly disposed in the end of said shaft within said opening and extending into said transverse slot, inserts receivable in the outer ends of said transverse slot and extending thereacross to provide relatively frictionless rolling surfaces for said trunnion and bearing assembly, and a cylindrical cover receivable about said housing and said inserts to retain said inserts in the ends of said transverse slot in said housing.

2. In a universal joint having a housing, said housing having a transverse slot therethrough and an axial shaft receiving opening therein, a shaft slidingly received in said opening and having a trunnion and bearing assembly secured in the end thereof, said trunnion and bearing assembly being received in said transverse slot in said housing, and inserts received in said housing at either end of said transverse slot and extending across said slot and inwardly extending between the walls of said slot and said trunnion and bearing assembly to provide rolling surfaces for said trunnion and bearing assembly and permit relatively frictionless axial movement of said assembly and said shaft within said housing.

3. A universal joint comprising a housing having a transverse slot therethrough and an axial shaft receiving opening therein intersecting said transverse slot, a shaft received in said opening, a trunnion transversally received in the end of said shaft within said opening, a bearing assembly and a bearing cap on each end of said trunnion and received in said transverse slot on opposite sides of said shaft, an insert of substantially the same cross sectional configuration as said bearing cap disposed in each end of said transverse slot and between the walls thereof and said bearing cap, said insert providing rolling surfaces for said bearing cap and permitting relatively frictionless axial movement of said trunnion and said shaft within said housing, resilient means in each end of said trunnion and abutting said bearing caps to bias said bearing caps into engagement with said inserts, and a cylindrical cover surrounding said housing and said inserts to retain said inserts in the proper relation within said housing.

4. In a universal joint having a housing and a transverse bearing cap receiving groove through said housing and a bearing cap rotatable within said groove, an insert comprising an arcuate upper portion to close the end of said groove, a flange formed from either side of said arcuate portion and extending into said groove between the walls thereof and said bearing cap, and a plurality of ears extending from said arcuate portion and abutting the exterior of said housing to retain said insert in proper bearing cap engaging relation in said housing.

References Cited in the file of this patent

UNITED STATES PATENTS

| | | |
|---|---|---|
| 990,627 | Bogart | Apr. 25, 1911 |
| 1,031,222 | Winton | July 2, 1912 |
| 1,582,997 | McGee | May 4, 1926 |
| 2,057,875 | Benham | Oct. 20, 1936 |

FOREIGN PATENTS

| | | |
|---|---|---|
| 522,036 | Great Britain | June 6, 1940 |